United States Patent [19]

Hoppmann

[11] Patent Number: 5,145,051
[45] Date of Patent: Sep. 8, 1992

[54] DISC FOR CENTRIFUGAL FEEDER

[75] Inventor: Kurt H. Hoppmann, Falls Church, Va.

[73] Assignee: Hoppmann Corporation, Chantilly, Va.

[21] Appl. No.: 724,768

[22] Filed: Jul. 2, 1991

[51] Int. Cl.⁵ .............................................. B65G 47/12
[52] U.S. Cl. ...................................... 198/396; 198/392; 221/167
[58] Field of Search ............... 198/392, 396, 408, 443; 221/160, 162, 167

[56] References Cited

U.S. PATENT DOCUMENTS

| 1,434,704 | 11/1922 | Jacques | 221/167 X |
| 4,007,854 | 2/1977 | Ervine | 221/167 |
| 4,154,329 | 5/1979 | Hildenbrand | 198/392 |
| 5,031,748 | 7/1991 | Bienchini et al. | 198/392 X |

FOREIGN PATENT DOCUMENTS

| 0632628 | 11/1978 | U.S.S.R. | 198/392 |
| 1348135 | 10/1987 | U.S.S.R. | 198/396 |
| 1404253 | 6/1988 | U.S.S.R. | 198/396 |

Primary Examiner—Robert P. Olszewski
Assistant Examiner—James R. Bidwell

[57] ABSTRACT

A centrifugal feeder for supplying objects includes a bowl for receiving objects to be fed therefrom and a rim mounted adjacent to an upper surface of the bowl. A disc is disposed within the bowl and extends at an incline from an area adjacent to a lower portion of the bowl upwardly to a point adjacent to the rim for delivering objects from the lower portion of the bowl upwardly to the rim. The disc is spaced a predetermined distance from an interior surface of the bowl to form a gap between the disc and the interior surface of the bowl. A drive member is provided for rotating the bowl and the disc at predetermined speeds and in a predetermined direction. A member is operatively connected to the disc for spanning the gap between the disc and the interior surface of the bowl for ensuring the delivery of objects from within the bowl to the rim and for preventing objects from falling or lodging within the gap.

7 Claims, 2 Drawing Sheets

DISC FOR CENTRIFUGAL FEEDER

BACKGROUND OF THE INVENTION

1. Field of the Invention

The present invention is directed to a disc for a centrifugal feeder which includes a member disposed around an outer peripheral surface thereof for spanning a gap formed between the disc and an interior surface of a bowl used for receiving objects to be delivered to a rim mounted adjacent to an upper surface of the bowl by means of the rotating disc which is mounted in an incline position within the bowl.

2. Description of Background Art

Hithertofore, centrifugal feeders have been constructed wherein a bowl member is provided for receiving objects to be feed therefrom. An inclined disc is disposed within the bowl for delivering objects from a lower portion of the bowl upwardly to a rim mounted adjacent to an upper surface of the bowl. A gap is necessary between the disc and an interior surface of the bowl due to the fact that the disc and the bowl normally rotate at different speeds. In addition, the disc and the bowl rotate in different planes. Further, the bowl and the disc are usually constructed of dissimilar material. In view of the dissimilar materials, a gap must exist between the bowl and the disc at all times to permit expansion and contraction during temperature variations.

Normally, if the object to be supplied by the centrifugal feeder is a large object, the gap between the disc and the interior surface of the bowl does not present a problem. However, a problem does exist if the object to be supplied by the centrifugal feeder is an extremely small object or a thin object which has a tendency to fall or lodge within the gap.

SUMMARY AND OBJECTS OF THE PRESENT INVENTION

It is an object of the present invention to provide a centrifugal feeder wherein a member is operatively connected to the disc for spanning the gap formed between the disc and the interior surface of the bowl for ensuring the delivery of objects from within the bowl to a rim for preventing objects from falling or lodging within the gap.

Another object of the present invention is to provide a member attached to an outer peripheral surface of the disc which is resiliently biased to accommodate various inconsistencies in the gap formed between the disc and the interior surface of the bowl to ensure that the gap is closed by the resilient member during rotation of the disc and bowl during normal feeding of objects disposed within the bowl.

A further object of the present invention is to provide a member operatively connected to a ring mounted adjacent to the rim of the bowl for ensuring the guiding of objects delivered to the rim and for preventing objects from slipping below the space formed between the rim and the ring during rotation of the rim relative to the ring.

These and other objects of the present invention are achieved by providing a centrifugal feeder for supplying objects which includes a bowl for receiving objects to be fed therefrom and a rim mounted adjacent to an upper surface of the bowl. A disc is disposed within the bowl and extends at an incline from an area adjacent to a lower portion of the bowl upwardly to a point adjacent to the rim for delivering objects from the lower portion of the bowl upwardly to the rim. The disc is spaced at a predetermined distance from an interior surface of the bowl to form a gap between the disc and the interior surface of the bowl. A drive member is provided for rotating each of the bowl and disc at predetermined speeds and in a predetermined direction. A member is operatively connected to the disc for spanning the gap between the disc and the interior surface of the bowl for ensuring the delivery of objects from within the bowl to the rim and for preventing objects from falling or lodging within the gap. In addition, a member is operatively connected to a ring mounted a predetermined distance above and adjacent to the rim for guiding objects delivered to the rim to a predetermined location. The member is designed to span the predetermined distance between the ring and the rim for ensuring the guiding of objects delivered to the rim and for preventing objects from slipping below or lodging within the predetermined distance between the ring and the rim.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
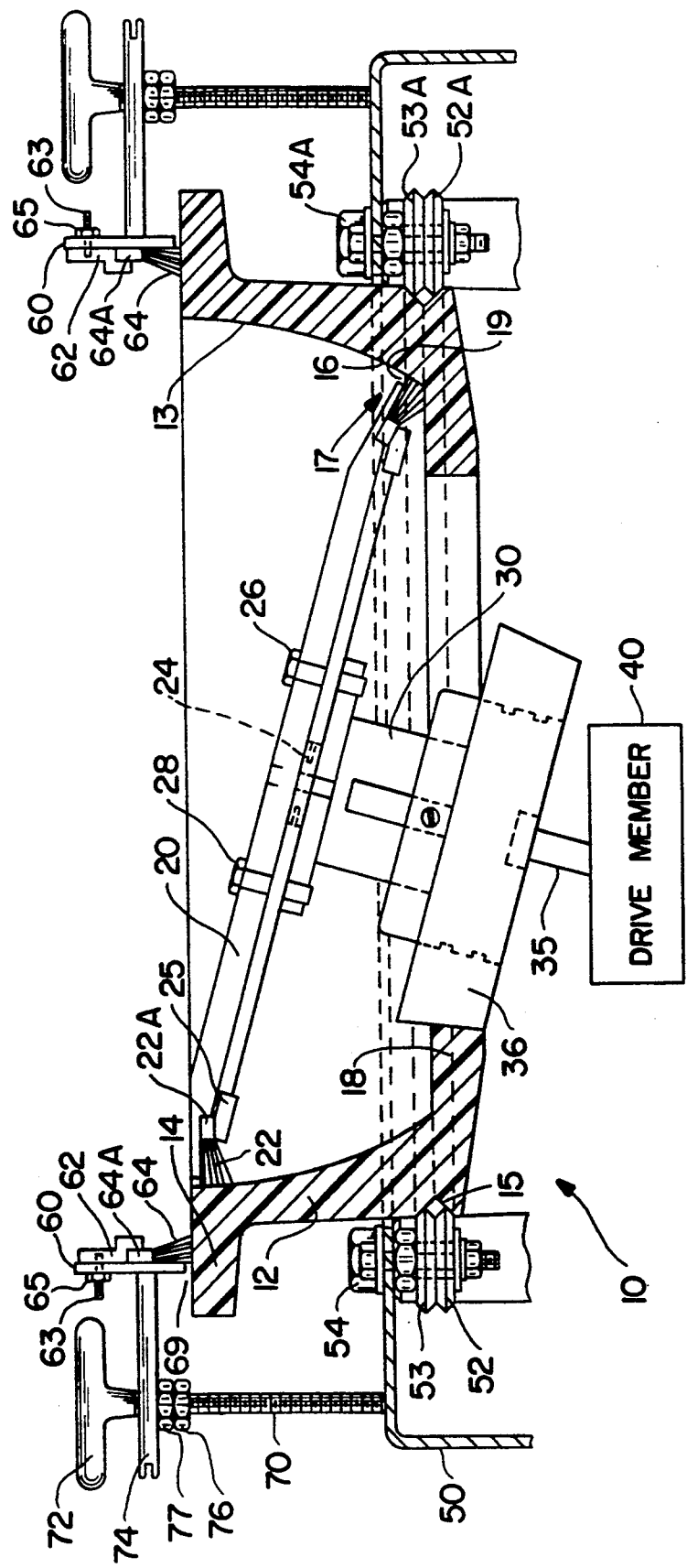
FIG. 1 is a cross-sectional view illustrating the centrifugal feeder with a disc having the improved means for spanning the gap between the disc and an interior surface of the bowl being attached to the disc.

As illustrated in FIG. 1, the present invention is directed to a centrifugal feeder 10 which includes a bowl 12 having an upper surface 13 and an interior surface 16. A rim 14 is mounted adjacent to the upper surface 13 of the bowl 12. A disc 20 is disposed within the bowl 12 and extends at an incline from a lower portion 17 of the bowl upwardly to a point adjacent to the rim 14. The disc 20 is designed for delivering objects within the lower portion 17 of the bowl 12 upwardly to the rim 14 for further processing. The disc 20 is spaced a predetermined distance 19 from the interior surface 16 of the bowl 12. The predetermined distance 19 forms a gap between the disc 20 and the interior surface 16 of the bowl 12 to accommodate for expansion and contraction of the materials from which the disc 20 and the bowl 12 are constructed. The bowl 12 includes a flange 18 projecting inwardly therefrom. A drive member 40 is provided which includes a drive shaft 35 operatively connected to the disc 20. As illustrated in FIG. 1, the disc 20 includes a recess portion 24 which mates with a coupling 30 operatively connected to the drive shaft 35. In addition, the disc 20 may be affixed to the coupling 30 by means of screws 26, 28. A resilient drive member 36 is secured to the coupling 30 for engaging the flange 18 of the bowl 12. In this way, as the drive member 40 imparts rotation to the drive shaft 35, the disc 20 rotates at a predetermined speed and in a predetermined direction. In view of the fact that the resilient drive member 36 engages the flange 18 at a distance which is spaced from the drive shaft 35, the bowl 12 rotates at a different rotational speed relative to the disc 20. Both the disc 20 and the bowl 12 rotate in the same direction.

A housing 50 is provided for mounting the bowl 12 for rotation. As illustrated in FIG. 1, the bowl 12 includes a groove 15 disposed around the outer surface thereof. Bearing guides 52, 53, 52A and 53A are provided in a fixed relationship relative to the housing 50 so as to guide the bowl 12 as the bowl is rotated by the drive member 40. A nut and bolt member 54 operatively mounts the bearing guides 52, 53 relative to the housing 50. Similarly a nut and bolt arrangement 54A operatively positions the bearing guides 52A, 53A relative to the housing 50. Additional bearing guides may be provided around the outer circumferential surface of the bowl 12 to guide the bowl 12 as the bowl rotates relative to the housing.

Mounting members 70 are provided and fixed to the housing 50. The mounting members 70 are threaded members for permitting a ring 60 to be mounted at a predetermined distance above the rim 14. As illustrated in FIG. 1, a mounting plate 74 may be secured to the threaded member 70 by means of positioning the mounting plate 74 between two nuts 76, 77 and a handle member 72. The handle member 72 is threaded onto the mounting member 70 to secure the mounting plates 74 between the nuts 76, 77 and the handle 72. In this way, the mounting plate 74 which is affixed to the ring 60 may position the ring 60 at a predetermined distance 69 above the rim 14. The predetermined distance 69 forms a space between the ring 60 and the upper surface of the rim 14. A member 64 is provided for spanning the predetermined distance 69 formed between the ring 60 and the rim 14. The member 64 includes a mounting portion 64A which is secured to the ring 60 by means of a flange member 62. The flange member 62 may include a threaded shaft 63 which is secured to the ring 60 by means of a nut 65. In the alternative, the securing member 64A may be actually welded or otherwise affixed to the ring 60 so as to avoid the necessity of using a flange member 62 for positioning the member 64 relative to the ring 60. The mounting plate 74 may be utilized to adjust the predetermined distance 69 between the lower surface of the ring 60 and the upper surface of the rim 14.

Figure 2:
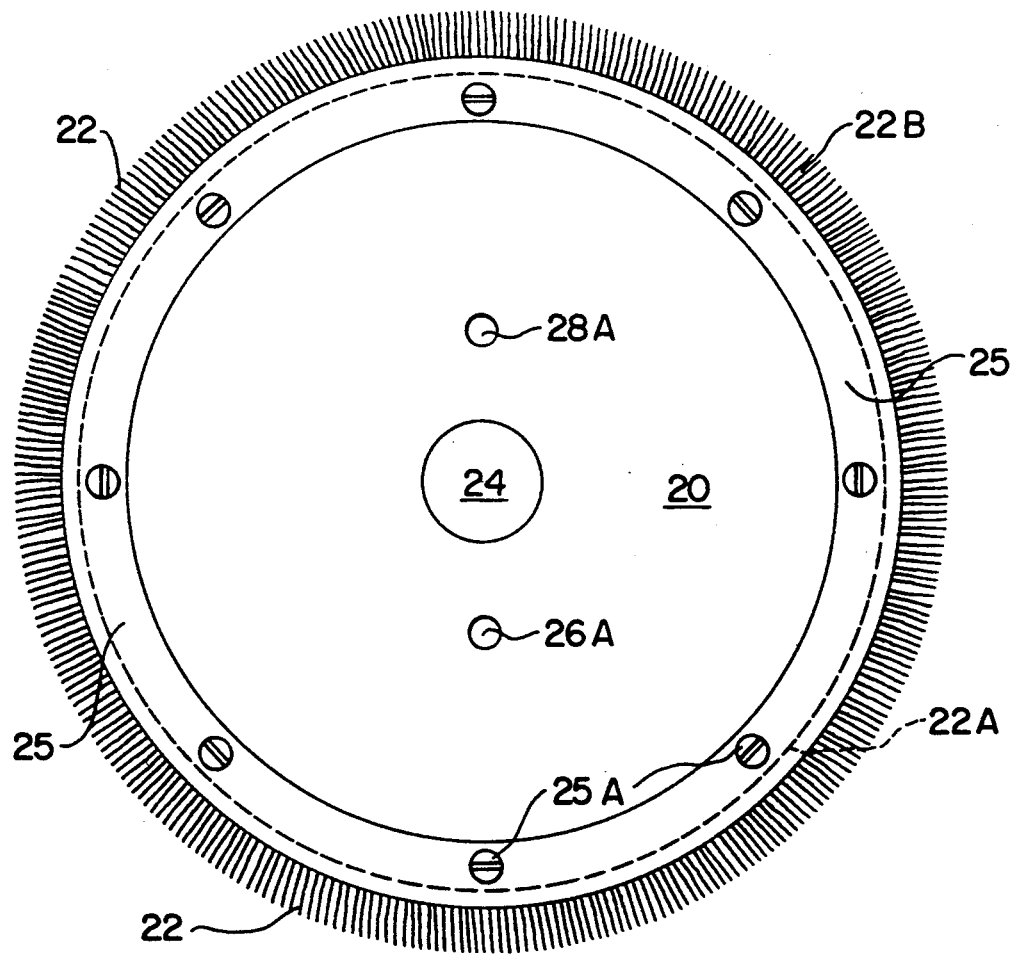
FIG. 2 is a bottom plan view illustrating the disc with the member for spanning the gap between the disc and the interior surface of the bowl being attached thereto.

As illustrated in FIGS. 1 and 2, the disc 20 includes a member 22 for spanning the gap 19 formed between the disc 20 and the interior surface 16 of the bowl 12. The member 22 includes a mounting portion 22A which is secured to the disc 20 by means of a rim 25. The rim 25 may be affixed to the disc 20 by means of a plurality of screws 25A.

As illustrated in FIG. 2, the disc 20 includes the recess portion 24 centrally mounted relative thereto. In addition, openings 26A and 28A are provided through which a bolt 26, 28 may be provided for securing the disc 20 relative to the coupling 30. The rim 25 is provided for securing the mounting member 22A relative to the disc 20. The member 22 for spanning the gap between the disc 20 and the interior surface 16 of the bowl 12 may be a brush formed by a plurality of bristles 22B. The bristles normally project radially outwardly from the disc 20. However, as the disc 20 is mounted within the bowl 12 and rotates, the bristles 22B will be deformed so as to assume a curved configuration which ensures the close fitting of the member 22 relative to the interior surface 16 of the bowl 12 to prevent objects from falling or lodging within the gap 19. The member 22 may be constructed of a large variety of flexible materials which are able to flex in a radial orientation so as to close the gap 19 to prevent objects from falling or lodging within the gap 19.

Normally, the disc 20 is mounted within the bowl 12 and the gap 19 is formed which will limit the usefulness of the centrifugal feeders with respect to very small or thin objects. For example, small pouches, small washers, various packaged pills, saran-wrapped candy or other objects which are thin or small have been known to lodge or fall within the gap 19 thus rendering the centrifugal feeder ineffective for feeding small parts. Many manufacturers have resorted to utilizing vibratory feeders for extremely small parts or thin objects in view of the deficiencies in the centrifugal feeders. However, vibratory feeders experience a problem in view of the fact that a large amount of noise is generated by utilizing a vibratory feeder.

The present invention overcomes the deficiencies in the prior art by providing a member 22 which spans the gap between the disc 20 and the interior surface 16 of the bowl 12. In this way, the resilient member 22 ensures the delivery of objects from within the bowl to within the rim and prevents objects from falling or lodging within the gap 19.

A similar problem has occurred with regard to the ring 60 which is mounted relative to the rim 14 for guiding objects off of the rim 14 after the objects are fed from the bowl 12 to the rim 14. Historically, very small or thin objects have fallen or lodged themselves within the predetermined space 69 formed by the bottom edge of the ring 60 and the upper surface of the rim 14. The member 64 is designed to span the predetermined distance 69 so as to ensure that objects which are delivered to the ring are guided therefrom for further processing.

The mounting of the disc 20 within the bowl 12 is in an incline position so as to feed objects within a lower portion 17 of the bowl 12 upwardly to the rim 14. Normally, the disc 20 will rotate at a different speed relative to the bowl 12. In some cases, the disc 20 will rotate faster than the bowl 12 for delivering parts disposed within the bowl 12 upwardly to the rim 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A disc for a centrifugal feeder for supplying objects comprising:
   a bowl for receiving objects to be fed therefrom;
   a rim mounted adjacent to an upper surface of said bowl;
   a disc disposed within said bowl and extending at an incline from a lower portion of said bowl upwardly to a point adjacent to said rim for delivering objects from said lower portion of said bowl upwardly to said rim, said disc being spaced a prede- termined distance from an interior surface of said bowl to form a gap between said disc and said interior surface of said bowl; and drive means for rotating said bowl and said disc at predetermined speeds and in a predetermined direction;

the improvement comprising:

means operatively connected to said disc for continuously spanning and accommodating a variation in said gap between said disc and said interior surface of said bowl for ensuring the delivery of objects from within said bowl to said rim and for preventing objects from falling or lodging within said gap.

2. The disc for a centrifugal feeder according to claim 1, wherein said means for spanning said gap is a brush affixed to said disc for engaging said interior surface of said bowl as said disc is rotated to deliver objects from within said bowl to said rim.

3. The disc for a centrifugal feeder according to claim 2, wherein said brush includes a plurality of bristles disposed adjacent to each other and further including a rim connected to said disc for retaining said bristles relative thereto.

4. The disc for a centrifugal feeder according to claim 1, wherein said means for spanning said gap is a resilient member affixed to said disc for engaging said interior surface of said bowl as said disc is rotated to deliver objects from within said bowl to said rim.

5. The disc for a centrifugal feeder according to claim 1, and further including a ring mounted a predetermined distance above and adjacent to said rim for guiding objects delivered to said rim to a predetermined location the improvement comprising:

means operatively connected to said ring for spanning said predetermined distance between said ring and said rim for ensuring the guiding of objects delivered to said rim and for preventing objects from slipping below or lodging within said predetermined distance between said ring and said rim.

6. The disc for a centrifugal feeder according to claim 5, wherein said means for spanning said predetermined distance between said ring and said rim is a brush affixed to said ring for engaging said rim of said bowl as said bowl is rotated.

7. The disc for a centrifugal feeder according to claim 5, wherein said means for spanning said predetermined distance between said ring and said rim is a resilient member affixed to said ring for engaging said rim of said bowl as said bowl is rotated.

* * * * *